United States Patent [19]

Perotto et al.

[11] Patent Number: 5,735,253
[45] Date of Patent: Apr. 7, 1998

[54] CONTROL SYSTEM FOR AN INTERNAL COMBUSTION ENGINE USING EITHER GASOLINE OR METHANE OR LPG AS A FUEL

[75] Inventors: Aldo Perotto, Meana di Susa; Roberto Boni, Candiolo; Giorgio Bortignon, Piossasco, all of Italy

[73] Assignee: C.R.F. Societa' Consortile per Azioni, Turin, Italy

[21] Appl. No.: 722,005
[22] PCT Filed: Jun. 13, 1995
[86] PCT No.: PCT/EP95/02296
  § 371 Date: Sep. 30, 1996
  § 102(e) Date: Sep. 30, 1996
[87] PCT Pub. No.: WO95/34752
  PCT Pub. Date: Dec. 21, 1995

[30] Foreign Application Priority Data

Jun. 16, 1994 [IT] Italy ................. TO94A0494

[51] Int. Cl.⁶ ........................................... F02B 13/00
[52] U.S. Cl. ................................. 173/575; 123/406
[58] Field of Search ..................... 123/575, 25 A, 123/25 C, 515, 674, 675, 1 A, 576, 406; 137/255, 267

[56] References Cited

U.S. PATENT DOCUMENTS

| | | | |
|---|---|---|---|
| 4,922,862 | 5/1990 | Casacci | 123/575 |
| 5,092,305 | 3/1992 | King | 123/575 |
| 5,172,655 | 12/1992 | Forgacs | 123/1 A |
| 5,467,755 | 11/1995 | Konrad et al. | 123/674 |
| 5,469,830 | 11/1995 | Gonzalez | 123/515 |
| 5,555,873 | 9/1996 | Nolen | 123/575 |
| 5,560,344 | 10/1996 | Chan | 123/515 |
| 5,592,924 | 1/1997 | Audisio et al. | 123/525 |

FOREIGN PATENT DOCUMENTS

| | | | |
|---|---|---|---|
| 3817471 | 11/1989 | Germany | 123/575 |
| 56-101072 | 11/1981 | Japan | 123/575 |
| 63-253172 | 2/1989 | Japan | 123/575 |

*Primary Examiner*—Raymond A. Nelli
*Attorney, Agent, or Firm*—Sughrue, Mion, Zinn, Macpeak & Seas, PLLC

[57] ABSTRACT

A control system for an engine adapted to operate either with gasoline injection or with methane or LPG injection, comprises a main electronic control unit (3) for controlling the gasoline injectors (1) and the ignition system (5) and an auxiliary electronic control unit (6) for controlling the mode of operation of the engine and the methane or LPG injectors (2). The auxiliary control unit (6) is further adapted to modify signals (9) representative of the angular position of the engine shaft which are to be sent to the main electronic control unit (3) in order to obtain an ignition adapted to the mode of operation with methane or LPG.

1 Claim, 1 Drawing Sheet

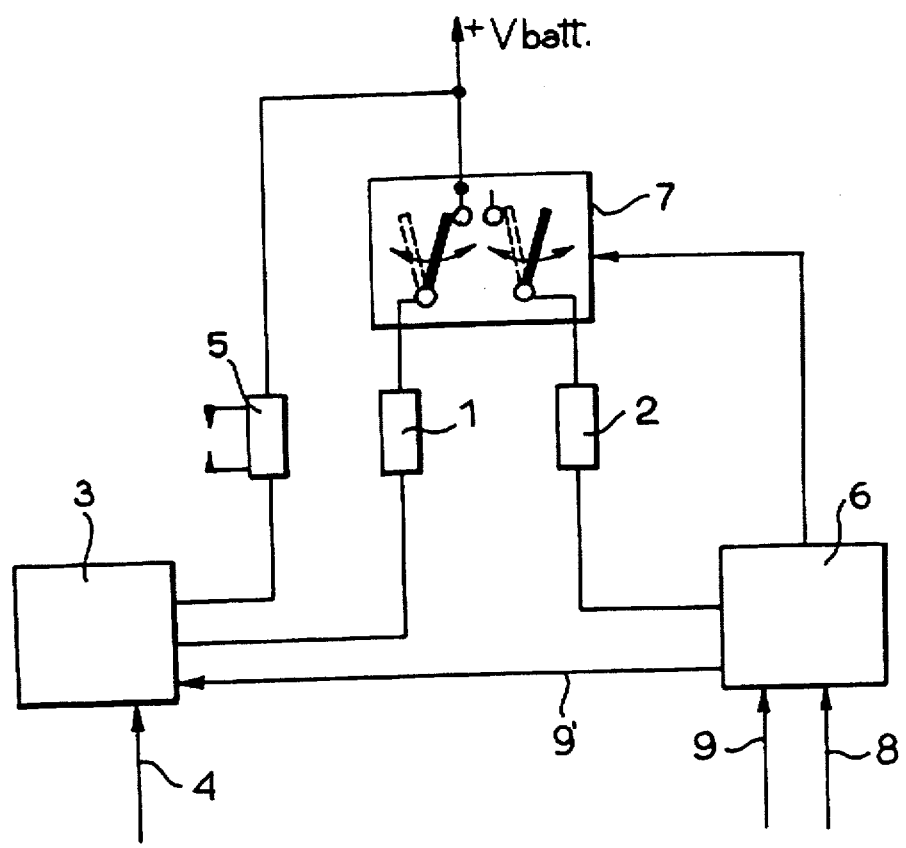

CONTROL SYSTEM FOR AN INTERNAL COMBUSTION ENGINE USING EITHER GASOLINE OR METHANE OR LPG AS A FUEL

BACKGROUND OF THE INVENTION

The present invention relates to control systems for internal combustion engine of the type comprising a gasoline feeding system including a plurality of gasoline injectors associated to the various cylinders of the engine and an electronic control unit for controlling the injectors on the basis of signals representative of the engine operating parameters, and for controlling ignition in the various cylinders of the engine on the basis of signals representative of the angular position of the engine shaft.

In recent years, the increasingly strict limitations imposed by the various laws to noxious emissions of internal combustion engines have determined a new interest by manufacturers towards engines using gas, particularly methane or LPG (Liquefied Petrol Gas) as a fuel.

According to the conventional technique, methane or LPG engines are provided with a choke device for motoring the fuel to be mixed with the air fed to the engine, according to an arrangement similar to that of a conventional carburator of a gasoline engine. This solution however is no longer acceptable since it is not adapted to operate in conjunction with an electronic system for controlling the operation of the engine which is able particularly of controlling the motoring as a function of the composition of the exhaust gasses sensed by means of a lambda sensor.

Therefore it has become advantageous to have methane or LPG engines provided with a fuel injection system.

A further problem lies in the need of adapting a gasoline injection engine so that it can use methane as a fuel. It is still to be noted that because of the gaseous state of the methane, the volumes involved are as an average ten times greater than those of a gasoline injection system. This means that an injector device designed for the injection of methane has a much greater size than a gasoline injector device. As a result of this, the structure of a gasoline injection engine cannot be used directly for the injection of methane.

In its previous Italian patent application No. TO94A000343, filed on 29 Apr. 1994, which is still secret at the filing date of the present patent application, the Applicant has already proposed a system which can be used to transform an engine which was originally able to operate only with gasoline injection, into an engine able to operate either with gasoline or with methane injection. In this system, each cylinder of the engine is provided both with a gasoline injector and with a methane injector.

SUMMARY OF THE INVENTION

The object of the present invention is that of further improving the solution previously proposed by the applicant, with specific reference to the system for controlling the operation of the engine, extending its application also to the injection of LPG.

In order to achieve this object, the invention provides a control system for internal combustion engine comprising a gasoline feeding system including a plurality of gasoline injectors associated to the various cylinders of the engine and an electronic control unit for controlling the injectors on the basis of signals representative of the engine operating parameters, and for controlling the ignition of various cylinders of the engine on the basis of signals representative of the angular position of the engine shaft, characterized in that said system further comprises a plurality of methane or LPG injectors, associated to the various cylinders of the engine and an auxiliary electronic control unit, comprising means for selecting a mode of operation of the engine among a mode only with gasoline feed, a mode only with methane or LPG feed and a mode with mixed feed, means for controlling said methane or LPG injectors on the basis of signals representative of the engine operating parameters, and means for modifying said signals representative of the angular position of the engine shaft which are sent to the main control unit, so that the ignition is adapted to the operation with methane or LPG feed.

Due to said features, the control system according to the invention is efficient and relatively simple. The task of controlling the ignition of the various cylinders of the engine is still fulfilled by the main control unit for controlling the gasoline injectors even in the mode of operation with methane or LPG, but in this case, this main control unit operates on the basis of signals which are (modified) by the auxiliary control unit so that the ignition becomes adapted to the mode of operation with methane or LPG.

BRIEF DESCRIPTION OF THE DRAWINGS

The invention will become apparent with reference to the annexed diagram, which shows the principle of operation of the system according to the invention.

DETAILED DESCRIPTION OF THE INVENTION

In the drawing, reference numeral 1 designates diagrammatically the plurality of gasoline injectors associated to the various cylinders of the engine, whereas element 2 diagrammatically designates the plurality of methane or LPG injectors associated to the various cylinders of the engine.

Reference numeral 3 generally designates the main electronic control unit which, according to the conventional technique, controls the operation of injectors 1 on basis of signals 4 representative of the various engine operating parameters, such as the signal coming from the so called lambda sensor, the signal representative of the position of the throttle valve, the signals representative of the temperature of the intaking air and the engine coolant, and so on. In the present description, the details relating to injectors 1, 2, as well as the electronic control unit 3 and the way by which this unit operates, are not shown, since they can be provided in any known way and do not fall, taken alone, within the scope of the present invention. The main control unit 3 has also the function, again according to the conventional technique, of controlling the engine ignition system 5.

According to the invention, there is provided an auxiliary electronic control unit 6, which is also constructed in any known way in order to fulfil a plurality of functions. Firstly, the control unit 6 controls a switch system 7, diagrammatically shown in the FIGURE, to switch the engine operation among a mode of operation only with gasoline, a mode of operation only with a gaseous fuel such as methane or LPG and a mixed mode of operation.

Furthermore, the electronic control unit 6 controls the methane or LPG injectors 2 on the basis of signals 8 representative of the various engine operating parameters, which can come from sensors already provided on the engine or by further additional sensors. These sensors are not shown nor are described in detail, since they are generally conventional.

An essential feature of the invention lies in that the electronic control 6 is also adapted to receive signals 9 representative of the angular position of the engine shaft, and if desired also of the angular position of the cam shaft and transmits these signals to the main electronic control unit 3 (line 9'). When the engine operates in the gasoline mode of operation, signals 9' are similar to signals 9 and the control unit 3 operates in the usual way, controlling the ignition system 5 on the basis of these signals. Naturally, the criterion for controlling the ignition must change if the engine is switched to the methane or LPG mode of operation. In this case, the function of controlling the ignition is still fulfilled by the main control unit 3, but this latter operates on the basis of signals 9' which are provided by the auxiliary control unit 6 by "modifying" the incoming signals 9.

The details relating to the way by which this result can be obtained are not shown herein, since they can be of any type, as it will be clearly apparent to those skilled in the art.

As shown, the invention enables an engine originally provided for operating only with gasoline to be easily adapted into an engine able to operate either with gasoline injection, or with methane or LPG injection, or with mixed injection. The transformation kit includes the methane or LPG injectors 2 and the auxiliary control unit 6 which has the function of controlling the system 7 for switching among the various possible modes of operation of the engine, as well as the function of controlling the methane or LPG injectors 2, whereas the function of controlling the ignition is left, also during methane or LPG operation, to the main control unit 3, which however in this case operates on the basis of signals obtained by the auxiliary control unit 3 by modifying the signals 9 representative of the angular position of the engine shaft.

Naturally, while the principle of the invention remains the same, the details of construction and the embodiments may widely vary with respect to what has been described and illustrated purely by way of example, without departing from the scope of the present invention.

What is claimed is:

1. A control system for an internal combustion engine comprising a gasoline feeding system including a plurality of gasoline injectors associated with a plurality of cylinders of the engine and a main electronic control unit for controlling the injectors on the basis of signals representative of engine operating parameters and for controlling ignition in said plurality of cylinders of said engine on the basis of signals representative of angular positions of the engine shaft, a plurality of gaseous fuel injectors associated with said plurality of cylinders and an auxiliary electronic control unit comprising:

means for selecting a mode of operation of the engine from a plurality of modes of operation including a mode only with gasoline feed, a mode only with gaseous fuel feed, and a mode with mixed feed;

means for controlling said gaseous fuel injectors on the basis of signals representative of said engine operating parameters; and means for modifying said signals representative of said angular positions of said engine shaft which are to be sent to said main electronic control unit, so that said ignition becomes adapted to operation with said gaseous fuel feed.

* * * * *